| United States Patent [19] | [11] 3,957,910 |
| van den Berg | [45] May 18, 1976 |

[54] ALKENE POLYMERS MODIFIED WITH HALOGENATED POLYALKENE

[75] Inventor: Cornelis E.P.V. van den Berg, Geleen, Netherlands

[73] Assignee: Stamicarbon B.V., Geleen, Netherlands

[22] Filed: Nov. 1, 1974

[21] Appl. No.: 520,205

[30] Foreign Application Priority Data
Nov. 2, 1973  Netherlands .................. 7315042

[52] U.S. Cl. .................. 260/878 R; 260/878 B; 526/78; 526/82; 526/87; 526/283; 526/295; 526/339
[51] Int. Cl.² ............ C08F 255/06; C08F 255/00; C08F 110/02; C08F 210/16
[58] Field of Search ......... 260/878 R, 878 B, 80.78, 260/88.2 R

[56] References Cited
UNITED STATES PATENTS
| 3,532,592 | 10/1970 | Kraus et al. .................. 260/878 R |
| 3,665,053 | 5/1972 | Mizutani et al. .................. 260/878 R |

FOREIGN PATENTS OR APPLICATIONS
1,371,089  10/1963  France

*Primary Examiner*—Alan Holler
*Attorney, Agent, or Firm*—Cushman, Darby & Cushman

[57] ABSTRACT

Polymers of ethylene characterized by wide molecular weight distribution are produced by reacting the product at temperatures of at least 100°C a mixture obtained by adding a alkene copolymer, containing reactive halogen to the polymerization product of ethylene optionally with a minor amount of another alpha-alkene in the presence of an active Ziegler-type polymerization catalyst.

24 Claims, No Drawings

ALKENE POLYMERS MODIFIED WITH HALOGENATED POLYALKENE

TEXT OF THE DISCLOSURE

The invention relates to preparing alkene polymers modified with halogenated polyalkenes. In particular, the invention relates to ethylene homopolymers or ethylene copolymers, which have a wide molecular weight distribution, by modification with halogenated polyalkenes.

Preparation of polyalkenes, in particular polyethylene, to be modified by polymerization of alpha-alkenes is well known in the art. Polyalkenes prepared according to polymerization processes of this kind, especially polyethylene, are largely crystalline. The characteristic of high crystallinity is disadvantageous in certain applications of these polyalkenes, particularly in the application of polyethylene for soap bottles, since the resistance against crack formation has not been optimized. By incorporation of suitable minor quantities, e.g. generally about 4% by weight, of another alpha-alkene, the crystallinity of polyethylene drops to some degree, while on the other hand, the resistance against crack formation under a load is improved.

The flow properties of alkene polymers, particularly ethylene homopolymers and ethylene copolymers, are of importance in extrusion and blow-molding processing, particularly in the manufacture of tubes or bottles. The flow properties of the alkene polymers are significant in casting, blowing of films and, in general, processing by extrusion. Polyalkenes of low molecular weights are characterized by good flow properties, but mechanical properties, including breaking strength, and resistance to crack formation under load and the like, must be improved. Generally, the mechanical properties of polyalkenes improve with increasing molecular weight, but the increase in molecular weight also results in the deterioration of flow properties.

It is known that molecular weight distribution influences the flow properties of polyalkenes. As the molecular weight distribution increases or grows wider, the flow properties of polyalkenes improve. For casting, extrusion, and blow-molding of polyalkenes, an easy flow, favored by wide molecular weight distribution is highly desirable.

The molecular weight distribution may be expressed in different ways. Generally, molecular weight distribution is related to the $M_w/M_n$, in which $M_w$ and $M_n$, respectively, represent the weight average and the numerical average of the molecular weight. Practically, the flow index of polyalkenes is used as a measure of the breadth of the molecular weight distribution. The flow index is determined by the ratio between the values of the melt-flow measured according to ASTM D-1238 at a high load and at a normal load. According to ASTM D-1238 the melt flow of polyethylene is usually measured at 190°C and a load of 2.16 kg. and is then called melt-index (m.i. for short). For the sake of comparison, the melt flow is also measured under a load of 5, 10, 21.6 or 30 kg. and indicated as $I_5$, $I_{10}$, $I_{21.6}$ and $I_{30}$ respectively. Flow index is here understood to be the value of $I_{30}/(m.i.)^{3/4}$.

At any specific melt-index value, the value molecular weight distribution is directly related to the value of the flow index. Particularly at a specific melt index value, the larger the molecular weight distribution the greater the flow index.

An important application of blow-molding is in the manufacture of bottles. For extrusion and blow-molding, particularly the blow-molding of bottles, polymers used should have a melt index smaller than 2 and larger than 0.001. Often, in the case of polyethylene which is highly suitable for use in the blow-molding of bottles, the term "bottle quantity" is used as a qualitative measure of melt index.

For processing methods, including blow-molding, where polyethylene of wide molecular weight distribution is required, the flow index should, generally, be larger than 10. Polyethylene having a flow index of at least 15 is preferred.

The prior art has recognized several methods for increasing the molecular weight distribution of polyalkenes. It is known that certain catalyst systems may be used in the polymerization of alkenes to form the polyalkenes, which affect the molecular weight distribution.

In addition, it has been proposed to undertake multistage polymerization processes, for instance, alpha-alkenes may be polymerized in two or more reactors connected in parallel and/or in series relationship under different polymerization conditions, such as different quantities of molecular weight regulator, for instance hydrogen, different catalyst compositions and/or concentrations, different residence times, and the like.

In general, these methods can indeed yield polyalkenes with a reasonably wide molecular weight distribution. However, multi-stage processes are difficult to control. In addition, multi-stage processes increase the cost of production of polyalkenes, and in particular polyethylene, which is commercially undesirable in view of the competitive markets for polyethylene.

SUMMARY OF THE INVENTION

In accordance with the invention, ethylene homopolymers and ethylene copolymers of wide molecular weight distribution are produced by adding, at temperatures of at least 100°C to (A) the polymerization of (1) ethylene and (2) optionally, another alpha-alkene, (B) a halogenated polyalkene, prior to deactivation of a polymerization catalyst. After allowing the halogenated polyalkene to react, the polymerization catalyst is deactivated and the polymer reaction product is processed in the usual way. More particularly, the improvement set forth below is directed to an improvement in the process of forming unhalogenated polyalkenes, which improvement comprises adding a halogenated polyalkene to said process.

The invention will be more fully understood in terms of the detailed description set forth below:

DETAILED DESCRIPTION OF THE INVENTION

It has been discovered that the addition of halogenated polyalkenes to processes for forming unhalogenated polyalkenes, particularly to processes for forming unhalogenated ethylene homopolymers and unhalogenated copolymers, results in the production of polyalkene polymers of wide molecular weight distribution. Wide molecular weight distribution is desirable in applications where high flow indexes are desirable, such as in casting, extrusion and blow-molding.

It has been found that polyalkenes, particularly ethylene homopolymers and ethylene copolymers with a wide molecular weight distribution can be prepared (1) by polymerizing an alpha-alkene, particularly ethylene, and optionally another alpha-alkene in the presence of a Ziegler-type catalyst, and (2) by adding, prior to the deactivation of the Ziegler catalyst, a small amount of a halogenated polyalkene containing an active halogen, at temperatures of above 100°C, which halogenated polyalkene is allowed to react in the presence of the non-deactivated catalyst, followed by subsequent deactivation of the catalyst and processing of the polyalkene reaction product by conventional methods. Thus, the invention is directed to an improvement in the process of Ziegler catalyst polymerizations of alpha-alkenes to produce unhalogenated polyalkenes, wherein the improvement comprises adding a small amount of halogenated polyalkene to the polymerization medium, prior to deactivation of a catalyst. Addition of the halogenated polyalkene prior to deactivation of the catalyst may occur before, during or after the polymerization process, but prior to deactivation of the catalyst.

The halogenated polyalkenes, containing reactive halogen, to be used in the present process, are obtained by halogenation of a polymer of an alpha-alkene, particularly of ethylene, and at least one non-conjugated alkadiene of 5 to 20 carbon atoms. Preferably, chlorinated polyalkenes, containing reactive chlorine atoms, are obtained by chlorination. Advantageously, halogenated polymers of at least two alpha-alkenes and at least one non-conjugated alkadiene are used. More preferably, when two alpha-alkenes and at least one non-conjugated alkadiene are employed to form a terpolymer which is subsequently halogenated, the two alpha-alkenes are ethylene and propylene, respectively.

Non-conjugated alkadienes which may be used include hexadiene-1, 4; dicyclopentadiene; vinylnorbornene; propenylnorbornene; ethylidenenorbornene; methyl cyclopentadiene dimer; cyclododecatriene; cyclooctadiene-1,5; and homologs thereof.

In reference to the halogenated polyalkene, the terminology, reactive halogen, means halogen atoms introduced into an alkene polymer, by halogenation, which polymer contains at least one non-conjugated alkadiene. Halogenation of said polymer containing at least one non-conjugated alkadiene, which polymer thereby still contains unsaturation, is easiest at or near the double bond. On halogenization of such polymers, not only addition but also substitution by halogen atoms takes place. It appears than in some instances, the addition reaction produces hydrogen halides. This resultant production of hydrogen halide allows for the substitution of halogen atoms near a double bond. Best results are obtained, in accordance with the invention, when a halogenated alkene polymer in which the non-conjugated alkadiene has a norbornene structure and, more particularly, is the dicyclopentadiene or a homolog thereof. Thus, the preferred non-conjugated alkadienes, used in forming the halogenated polyalkene, used in accordance with the invention, are formed from non-conjugated alkadienes including vinylnorbornene, propenylnorbornene, ethylidenenorbornene, dicyclopentadiene and homologs thereof.

The halogenated polyalkenes, particularly the halogenated alkadiene-containing alkene polymers may be formed from an alkadiene and one alkene, wherein said alkene is said ethylene or propylene, butylene-1, pentene-1, and hexene-1, decene-1, and the like, but also the halogenated alkadiene-containing alkene polymer may be formed of an alkadiene with two or more alkenes, wherein said two or more alkenes are ethylene or propylene, butylene-1, pentene-1, hexene-1, and decene-1. Preferably, when the halogenated alkadiene-containing alkene polymer is formed of an alkadiene with two alkenes, the two alkenes are ethylene and propylene.

Polymers of ethylene, propylene and at least one non-conjugated alkadiene have become known as EPT or EPDM. The ethylene to propylene ratio in the copolymers is not of importance in the present process and, hence, any copolymer may be used, provided a non-conjugated alkadiene has been incorporated in it by polymerization. EPT or EPDM resins may be halogenated and used as the halogenated polyalkene of the invention.

EPDM normally contains 30 to 70 molar percent (preferably 50 to 60 molar percent) of ethylene, 65 to 20 molar percent (preferably 35 to 54 molar percent propylene) and 1 to 15 molar percent (preferably 3 to 5 molar percent) of the non-conjugated alkadiene. Usually the alkadiene is not over 10 molar percent. The ethylene and propylene can each be 5 to 95 molar percent of the composition.

As used above, the term non-conjugated alkadiene includes aliphatic non-conjugated polyene hydrocarbons and cycloaliphatic non-conjugated polyene hydrocarbons, e.g. endocyclic dienes. Specific examples of suitable non-conjugated polyolefins include pentadiene-1, 4; hexadiene-1-4; dicyclopentadiene; methyl cyclopentadiene dimer, cyclododecatriene, cyclooctadiene-1, 5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g. ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1, 4.

Examples of EPDM rubbers are given in U.S. Pat. Nos. 2,933,480; 3,000,866; 3,063,973; 3,093,620; 3,093,621, and 3,136,739, in British Patent No. 880,904 and in Belgian Patent No. 623,698, the disclosures of which are hereby incorporated by reference.

Terpolymers and other EPDM rubbers from ethylene, propylene and dicyclopentadiene are exemplified in Tarney U.S. Pat. No. 3,000,866; Adamek U.S. Pat. No. 3,136,739 and Dunlop (British) Patent No. 880,904. EPDM rubbers from ethylene, propylene and 1,4-hexadiene are exemplified in Gresham U.S. Pat. No. 2,933,480. As shown in Gresham, other suitable non-conjugated diolefins are 1,4-pentadiene; 2-methyl-1, 5 hexadiene, 3, 3-dimethyl-1, 5-hexadiene; 1, 7-octadiene, 1, 9-decadiene, 1, 19-eicosadiene, 1, 4-hexadiene, 1, 9 octadecadiene, 6-methyl-1, 5-heptadiene, 7-methyl-1, 6-octadiene, 11-ethyl-1, 11-tridecadiene.

EPDM rubbers from ethylene, propylene and 5-methylene-2-norbornene are exemplified in U.S. Pat. No. 3,093,621. Suitable norbornadiene, e.g. 2-methyl norbornadiene, 2-ethyl norbornadiene, 2-n-hepyl norbornadiene are shown in Gladding U.S. Pat. No. 3,063,973 and bicyclo compounds such as bicyclo (2,2,2) heptadiene-2, 5, are shown in Dunlop (British) Patent No. 880,904. The use of cyclooctadiene-1, 5 and other cyclodienes is shown in Montecatini (Belgium) Patent No. 623,698. Thus these can be used in making the EPDM elastomer 1, 4-cycloheptadiene, 1, 4-cyclooctadiene, 1, 6-cyclodecadiene, 1, 5-cyclododecadiene, 1, 7-cyclodecadiene, 1, 5, 9-cyclododecatriene, 1-methyl-1, 5-cyclooctadiene.

Halogenation of the copolymers containing non-conjugated alkadienes, to form the halogenated polyalkene used in accordance with the invention, may be affected according to any method suitable for this purpose, for instance according to the Netherlands Patent Applications Nos. 66,17714; 70,03276 and 71,17709, the disclosures of which are hereby incorporated by reference.

The halogen-containing copolymers, particularly the chlorine-containing ethylene-propylene terpolymers which can be applied to advantage in the present process contain 1–10% by weight of non-conjugated alkadiene. Terpolymers with more than 10% by weight of alkadiene can be applied indeed, but they do not bring advantage. Generally, the terpolymers commercially available contain less than 10% by weight, as a rule 2–6% by weight, of alkadiene.

The halogenation is so effected that the units originating from the non-conjugated alkadiene in the polymer have substantially reacted with the halogen to produce a halogenated polyalkene containing about one halogen atom per non-conjugated alkadiene moiety of the polyalkene. The halogenation may further be continued, so that alkene units also react with halogen, but this does not bring advantage.

The purpose of the modification with the halogenated copolymers described above is to improve the flow index without appreciably influencing other mechanical properties, notably the elongation and rigidity.

As set forth above, the invention is directed to producing ethylene homopolymers and ethylene copolymers which are modified to increase the molecular weight distribution and the flow index of the base ethylene homopolymer or the base ethylene copolymer. The process of the invention comprises an improvement in the basic Ziegler type polymerizations of alpha-alkenes, alone or optionally in the presence of a second and different alpha-alkene. Thus, the invention is an improvement in the process of polymerizing an alpha-alkene, alone or optionally in the presence of one or more alpha-alkenes, deactivating the catalyst, and isolating the polymer wherein the improvement comprises adding a halogenated polyalkene prior to deactivation of the Ziegler catalyst and at temperatures of at least 100°C. By this process, the polymers produced by the Ziegler polymeration are modified by the halogenated polyalkene. The modification results in a wider molecular weight distribution of the resulting copolymers than polymers produced by the Ziegler polymerization without modification in accordance with the invention. Melt indexes of polymers produced in accordance with the invention range between about 0.001 to about 10. Preferably, the melt indexes are characterized from about 0.1 to about 5.

The flow indexes of modified polymers in accordance with the invention range from about 10 to 50. As a result of the modification of the process, flow indexes are increased by a factor 1.3–3.

The basic Ziegler catalyst polymerization of alpha-alkenes and the process parameters employed are well known. Generally, an alpha-alkene is polymerized in the presence of a Ziegler catalyst in an inert solvent under inert reaction conditions, particularly in the absence of air and moisture. The Ziegler catalyst is generally formed of a reducible compound of a transition metal with a reducing organometalic compound, usually an alkylaluminum.

When Ziegler catalysts are employed to polymerize alpha-alkenes, and mixtures of alpha-alkenes, inert solvents are employed. By inert is meant that the solvents will not interfere with the reaction nor act to destroy the catalyst. Generally, aliphatic hydrocarbon solvents, or mixtures thereof are employed. The Ziegler catalyst polymerization of alpha-alkenes may be undertaken as a solution polymerization, or as a slurry or suspension polymerization. Solution polymerizations are undertaken at temperatures of above 100°C, since above 100°C, polyalkenes, particularly polyethylene is soluble in the inert reaction solvents. Slurry and suspension polymerizations are undertaken at temperatures below 100°C.

The invention is directed to the modification of homopolymers of ethylene and copolymers of ethylene, to increase the molecular weight distribution and to increase the flow index of the base polymer. When a copolymer of ethylene is to be modified, the alpha-alkene used with ethylene to form the copolymer may be propylene, butene-1, pentene-1, hexene-1, decene-1, etc. The amount of comonomer in the ethylene polymer may be up to 4% by weight.

To the Ziegler polymerization at most 10% by weight of halogenated polyalkene is added, said percent by weight based on the polyalkene whose molecular weight distribution is to be extended. Less than 1% by weight does not, or does not substantially, produce extension. By preference 3–7% by weight of the halogenated alkene polymer is used.

A smooth reaction of the halogenated polyalkene and the polyalkene, produced in the Ziegler polymerization, which still contains active catalyst, only takes place at temperatures about 100°C. Below 100°C the reaction rate becomes so sluggish as to be unacceptable.

After the halogenated polyalkene is added to the polymerization mixture, prior to the deactivation of the Ziegler catalyst, and allowed to react, the Ziegler catalyst is thereafter deactivated. It is well known in the art that deactivation of the Ziegler catalyst is undertaken by the addition of hydroxylated materials such as alcohol or water. The corrosive by-products produced by deactivation may be neutralized by a soluble alkaline material. In some instances it may be desirable to remove the alcohol-soluble alkoxy metal compound before neutralization. Residual metals which are not removed must be treated to become inert and free of residual acidity. Residual acidity may lead to corrosion of the processing equipment or to deterioration of the polymer. Conversion of the residual metals to oxides is convenient and effective, since the oxides of the metals are not reactive.

In order to work up the polymer, after removal of the insoluble catalyst, the alcohol or water must be flashed to remove alcohol and water from the product. Inert solvents are removed, and the polymer is processed to remove water, unreacted monomer, and alcohol if any. At temperatures about 100°C a polyalkene, particularly polyethylene, becomes soluble in the inert reaction solvents normally used, in the Ziegler catalyst polymerizations such as aliphatic hydrocarbons or mixtures thereof. Preferably, the polymer concentration in solvent and the reaction temperatures are chosen so that the polyalkene is completely dissolved. The present process, therefor, is particularly suitable for application in polymerization processes wherein a solution of the polyalkene is obtained. If desired, these solutions may be concentrated first. Polymerizations in which the polyalkene is obtained in solution are described e.g. in U.S. Pat. Nos. 2,862,917 and 3,491,073. Polyalkenes, especially polyethylene, which have been prepared in solution have rather narrow molecular weight distributions. The present process, therefore, offers particularly great advantages in case of solution-polymerizations of this kind.

The halogenated polyalkene containing a non-conjugated alkadiene may be added before, during or after the polymerization. At polymerizations below 100°C, in so-called slurry or suspension polymerizations, hardly any reaction takes place and the temperature must in those cases, be increased to at least 100°C after the alkene polymerization has terminated.

For this reason the halogenated polymer is preferably added when the polymerization has been largely or fully completed. At polymerizations above 100°C the halogen-containing polymer may perceptibly react, during the polymerization, with the polymer already formed. However, the activity of the catalyst appears to become reduced to some extent and therefore, in these polymerizations, the halogenated polymer is, by preference, added after the polymerization.

Preferably, the halogenated polymer is then added immediately after the polymer solution has been drained out of the polymerization reactor, and the conversion is allowed to proceed at temperatures which do not differ, or differ only slightly, from the polymerization temperature.

The polymer solution may also be concentrated first, through removal of part of the solvent and the non-converted monomers by evaporation.

Of course, the reaction temperature must lie below the decomposition temperature of the polymers, i.e. below about 300°C. By preference, the temperature is chosen below approximately 230°C. In order to achieve a satisfactory reaction rate the temperature should, preferably, be at least 120°C. Temperatures of 140°-180°C are preferred. At these values the reaction proceeds rapidly and without undesirable side-effects.

The reaction rate depends not only on the temperature, but also on such factors as the catalyst concentration and the kind of polymer containing halogen.

By determination of the melt index one can establish when the conversion is completed. The melt index no longer decreases after conversion is completed.

After the conversion of the polyalkene with the copolymer containing halogen, preferably chlorine, the catalyst is deactivated in the usual way, whereupon the polymer is processed in a way known in the art as such.

By application of the process according to the invention modified polyalkenes are obtained whose melt index is decreased with respect to the non-modified polyalkene and whose flow index is increased.

Since the melt index is decreased, it is preferable to start from a polyalkene whose melt index is not too low. Processing of a polyalkene, particularly polyethylene, already having a high molecular weight, may become difficult as a result of the modification. Thus, the melt index of the non-modified polyalkene should preferably amount to at least 1. The halogen-containing copolymer is added in solution, for instance in an aliphatic hydrocarbon, or a mixture thereof, to the polyalkene, which is preferably dissolved, and which will still contain active catalyst. By preference, the halogen-containing copolymer is dissolved in the same solvent in which the polymerization of the alkene is effected.

The terpolymer containing halogen, particularly chlorine, appears to be reactive with Ziegler catalyst systems. It is not clear which reaction mechanism controls, but it is assumed — though this cannot be considered a statement by which applicant is bound — that the halogen-containing copolymer reacts via active places in the so-called living polyalkene, in which coupling of the two polymer products takes place and, in this way, leads to molecule enlargement, branchings, and possibly, cross-linkage.

The invention will further be elucidated by means of the following examples without being limited thereby.

EXAMPLES 1–3

1 liter of dry pentamethylheptane was transferred to a 2-liter glass reactor, with exclusion of air and moisture. Said heptane was subsequently, with stirring and at normal pressure, saturated with a mixture of ethylene and hydrogen containing about 2 vol. -% of hydrogen, referred to ethylene, and heated to 140°C. Successively, 2 moles of diethylaluminum-chloride, 1.4 moles of decanol, 0.4 mole of dibutylmagnesium, and, finally, 0.1 mole of titaniumtetrachloride were then added. While the ethylene/hydrogen mixture was introduced, polymerization was carried out for 10 minutes. Next, the ethylene/hydrogen mixture was replaced by nitrogen, and part of the solution was drained, deactivated with excess decanol, and cooled, whereupon the polyethylene was filtered off and dried. To the solution which had been left behind in the reactor and which still contained active catalyst, 1.7% by weight, based on the polyethylene, of chloroethylenepropyleneterpolymer was added in the form of a solution in pentamethylheptane containing 20 g of chloroethylenepropyleneterpolymer per liter. The chloroethylenepropyleneterpolymer had been prepared from an ethylenepropyleneterpolymer which, in addition to ethylene, contained 28% by weight of propylene and approximately 4% by weight of dicyclopentadiene (DCPD) by chlorination. Said chloroethylenepropyleneperpolymer contained 0.25% by weight of non-converted DCPD, 0.53% by weight of allylically bound chlorine (ClDCPD), 0.76% by weight of chlorine bound by an addition reaction, and 1.01% by weight of chlorine bound in the ethylenepropylene chain.

After a reaction period of 15 minutes at 140°C under nitrogen this solution too was drained and processed in the same way as the non-modified polyethylene. The melt index and the $I_{30}$ of the non-modified and the modified polyethylene were measured.

The above test was repeated, with the modification being use of chloroethylenepropyleneterpolymer, based on polyethylene, which amounted to 5.4% by weight (test 2), and to 6.4% by weight (test 3).

The results are given in Table I below.

Table I

| example | non-modified m.i. | flow. i. | modified m.i. | flow. i. | weight % of Cl — EPT |
|---|---|---|---|---|---|
| 1 | 6.1 | 10 | 1.75 | 14 | 1.7 |
| 2 | 10.8 | 8 | 1.1 | 20 | 5.4 |
| 3 | 8.4 | 8 | 0.5 | 20 | 6.4 |

This table shows that the modification with Cl-EPT has caused the melt index to decrease and the flow index to increase.

EXAMPLES 4–6

The procedure described in the Examples 1–3 was repeated, except that instead of a chloroethylenepropylene-terpolymer an ethylenepropylene-terpolymer was added. In Example 4, 8.4% by weight, based on the polyethylene, of an ethylenepropyleneterpolymer containing 4% by weight of DCPD were added. In Example 5 the addition of ethylidenenorbornene (EN) amounted to 7.8% by weight of EPT. Also in these cases the reaction was allowed to continue for 15 minutes at 140°C.

Seeing that the melt index was indeed decreased, but that the flow index was not affected, Example 4 was repeated with 5.9% by weight of EPT containing about 4% by weight of DCPD, which was allowed to react for 1 hour instead of for 15 minutes. The results are given in the following Table II, which shows that some decrease in melt index has indeed occurred, but that the flow index has remained unchanged within the measuring accuracy, and, in the case of Example 6, has even become decreased to some degree.

Table II

| example | non-modified m.i. | flow. i. | modified m.i. | flow. i. | weight % of EPT | notes |
|---|---|---|---|---|---|---|
| 4 | 3.4 | 8 | 1.1 | 8.5 | 8.4 | contains about 4% of DCPD |
| 5 | 5.0 | 8.5 | 1.7 | 9.0 | 7.8 | contains about 8% of EN |
| 6 | 2.5 | 10 | 1.4 | 8.5 | 5.9 | contains about 4% of DCPD reaction period 1 hour |

EXAMPLES 7–8

The procedure of the Examples 1–3 was repeated, except that a chlorine-EPT (Cl-EPT) was used which had been obtained by chlorination by an EPT contained 4% by weight of ethylidenenorbornene and no DCPD. Said chlorinated EPT contained 0.7% by weight of chlorine bound in the ethylenepropylene chain 1.9% by weight chlorine bound by an addition reaction and no allylically bound chlorine. After 15 minutes of conversion the flow index had not changed. The test was repeated with application of a reaction period of 1 hour for the polyalkene and the Cl-EPT. The flow index then appeared to have increased. The results are given in Table III.

Table III

| example | non-modified m.i. | flow. i. | modified m.i. | flow. i. | weight % of Cl-EPT | notes |
|---|---|---|---|---|---|---|
| 7 | 3.1 | 10 | 1.1 | 9.5 | 6.2 | reaction period 15' |
| 8 | 4.4 | 10 | 1.2 | 14 | 6.4 | reaction period 1 hour |

EXAMPLES 9–11

The procedure described in the Examples 1–3 was applied, except that the conversion of the chlorine-EPT with the solution still containing active catalyst was effected at temperatures of 120°C, 140°C, respectively, 170°C, and that, after 15 minutes, about one-third of the reaction product was drained and processed, followed by one-third after 30 minutes, and by the remainder after 60 minutes.

The results are summarized in Table IV. This table shows that at 170°C the reaction is completed after 15 minutes. At the low melt index values of the reaction product the differences in the flow index are within the measuring accuracy. At least 120°C the reaction rate appears to be much lower, so that, after 15 minutes, the melt index has indeed decreased, but also that there is hardly any question of an increase of the flow index.

Table IV

| examples | non-modified m.i.f.i. | reaction period, in min | temp °C | modified m.i.f.i. | weight % of Cl-EPT referred to polyethylene |
|---|---|---|---|---|---|
| 9 | 2.7 10.5 | 15 | 120 | 6.0 11 | 4.5 |
|   |          | 30 |     | 4.7 15.5 |   |
|   |          | 60 |     | 3.1 32 |   |
| 10 | 7.9 9.0 | 15 | 140 | 0.9 17 | 4.7 |
|    |         | 30 |     | 0.7 19 |   |
|    |         | 60 |     | 0.6 25 |   |
| 11 | 2.5 10.0 | 15 | 170 | 0.05 20 | 8.0 |
|    |          | 30 |     | 0.06 18 |   |
|    |          | 60 |     | 0.05 23 |   |

EXAMPLES 12–14

The procedure of the Examples 1–3 was repeated, except that the Cl-EPT was present during the polymerization. For the sake of comparison a test (No. 13) was conducted without Cl-EPT, a yield of 16.8 g of polyethylene per liter being obtained. The melt index amounted to 5, the flow index to 9. Moreover, in order that a polythylene having a low melt index be obtained, also a test (No. 14) was performed in which hydrogen was not added. Sixteen g of polyethylene per liter were then obtained. The melt index amounted to 0.023, the flow index to 5. With hydrogen and 9.4% by weight of Cl-EPT (test No. 12), 12.8 g of polyethylene having a melt index of 0.024 and a flow index of 10 were obtained per liter. The yield appears to decrease because of the presence of Cl-EPT.

EXAMPLES 15–17

The procedure described in the Examples 1–3 was carried out with different catalyst compositions.
The results are summarized in Table V.

Table V

| examples | cat.composition mmoles/l | non-modified m.i. | f.i. | modified m.i. | f.i. | weight % of Cl-EPT |
|---|---|---|---|---|---|---|
| 15 | 2 SEAC* 1.0 decanol 0.8 DBM* 0.1 TBT* | 6.2 | 10 | 0.73 | 16 | 6.7 |
| 16 | 2 SEAC 2 decanol 0.2 VCl$_4$ | 0.53 | 9.5 | 0.17 | 12 | 4.3 |
| 17 | 2 DEAC* 1.4 decanol 0.4 DBM* 0.05 TiCl$_4$ 0.05 V comp* | 1.38 | 7.5 | 0.26 | 12.5 | 6.4 |

*SEAC = ethylaluminiumsesquichloride, DEAC = diethylaluminiumchloride
TBT = tetrabutoxytitanium
DBM = dibutylmagnesium
V comp. = VO [OP = O (OC$_2$H$_5$)$_2$]$_2$

What is claimed is:

1. In a process for preparing alkene polymers, said polymers being ethylene homopolymers and ethylene copolymers, comprising polymerizing ethylene or a mixture of ethylene and a minor amount of a second alpha-alkene of 3 to 10 carbon atoms, in an inert solvent at a temperature of 10° to 220°C with the aid of a Ziegler-type catalyst; thereafter deactivating the catalyst and isolating the resulting alkene polymer, the improvement comprising adding, prior to deactivation of the catalyst, a small amount of a halogenated alkene copolymer, containing reactive halogen, and reacting at temperatures of at least 100°C, whereby modified alkene polymers are produced which have a wide molecular weight distribution.

2. Process according to claim 1, wherein the halogenated alkene copolymer containing reactive halogen is a halogenation product of an alkene polymer, which contains at least one non-conjugated alkadiene incorporated by polymerization.

3. Process according to claim 1, wherein the halogen is chlorine.

4. Process according to claim 2, wherein said halogenated copolymer is formed of (1) ethylene, (2) at least one other alpha-alkene of 3 to 10 carbon atoms, and (3) a non-conjugated alkadiene of 5 to 20 carbon atoms.

5. Process according to claim 4, wherein said halogenated copolymer is formed of ethylene, propylene, and a non-conjugated alkadiene.

6. Process according to claim 2, wherein the non-conjugated alkadiene contains a nonbornene structure.

7. Process according to claim 6, wherein the non-conjugated alkadiene is dicyclopentadiene or methylcyclopentadiene dimer.

8. Process according to the claim 2, wherein the halogenated alkene polymer containing 1–10% by weight of alkadiene is employed.

9. Process according to claim 8, wherein said halogenated alkene polymer includes 2–6% by weight of alkadiene.

10. Process according to claim 1, wherein 1–10% by weight of the halogenated polymer, referred to the polyalkene, is reacted with the polyalkene.

11. Process according to claim 10, wherein 3–7% by weight of halogenated alkene copolymer based on unhalogenated polyalkene is reacted with the polyalkene.

12. Process according to claim 1, wherein the process is undertaken at temperatures of between 100° and 300°C.

13. Process according to claim 2, wherein the process is undertaken at temperatures of between 120° and 230°C.

14. Process according to claim 13, wherein the process is undertaken at temperatures of 140° to 180°C.

15. Process according to claim 1, wherein the alkene copolymer containing the reactive halogen is added after the polymerization of the alkene has been largely or fully completed.

16. Process according to claim 15, wherein the unmodified alkene polymer is an ethylene homopolymer.

17. Process according to claim 1, wherein the halogenated alkene copolymer containing the reactive halogen is added at the beginning of the polymerization of ethylene or mixture of ethylene and a second alpha-alkene.

18. Process according to claim 1, wherein said halogenated alkene copolymer containing the reactive halogen is added during the polymerization of said ethylene or a mixture of ethylene and a second alpha-alkene.

19. Process according to claim 18, wherein said halogenated alkene copolymer has a chlorine content of 0.25 to 7 % by weight.

20. Process according to claim 19, wherein said halogenated alkene copolymer has a chlorine content of 0.5 to 4 % by weight.

21. Process according to claim 1, wherein an ethylene polymer containing up to 4 % by weight of another alkene is modified.

22. Process according to claim 16, wherein ethylene is polymerized with a minor amount of another α-alkene.

23. Process according to claim 16, wherein the process is undertaken at temperatures of between 100° and 300°C.

24. Process according to claim 16, wherein said halogenated alkene copolymer has a chlorine content of 0.25 to 7% by weight.

* * * * *